(12) United States Patent
Sada et al.

(10) Patent No.: US 7,786,640 B2
(45) Date of Patent: Aug. 31, 2010

(54) DRIVE DEVICE

(75) Inventors: Natsuki Sada, Anjo (JP); Masahiro Tanae, Okazaki (JP); Manabu Miyazawa, Anjo (JP); Tomohiko Ito, Anjo (JP); Takafumi Koshida, Anjo (JP); Tatsuyuki Uechi, Anjo (JP); Tomoo Atarashi, Kariya (JP); Daisuke Iimura, Takahama (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 12/385,204

(22) Filed: Apr. 1, 2009

(65) Prior Publication Data
US 2009/0267352 A1 Oct. 29, 2009

(30) Foreign Application Priority Data
Apr. 28, 2008 (JP) .............................. 2008-117399

(51) Int. Cl.
*H02K 7/20* (2006.01)
(52) U.S. Cl. .................. 310/112; 310/113; 310/98; 310/75 R
(58) Field of Classification Search ............... 310/75 R, 310/68 R, 83, 112–114, 98–99
See application file for complete search history.

(56) References Cited
U.S. PATENT DOCUMENTS
2,463,349 A * 3/1949 Baner .......................... 310/112
4,274,023 A * 6/1981 Lamprey ..................... 310/83
4,691,119 A * 9/1987 McCabria .................... 307/84
5,744,895 A * 4/1998 Seguchi et al. ............... 310/266
6,118,194 A * 9/2000 Kawamura ................. 310/75 R
6,166,498 A    12/2000 Yamaguchi et al.
7,211,912 B2   5/2007 Takenaka et al.

FOREIGN PATENT DOCUMENTS
| JP | A-2000-217205 | 8/2000 |
| JP | A-2004-343845 | 12/2004 |
| JP | A-2007-124764 | 5/2007 |
| JP | A-2008-290621 | 12/2008 |
| WO | WO 2008/146769 A1 | 12/2008 |

* cited by examiner

*Primary Examiner*—Thanh Lam
(74) *Attorney, Agent, or Firm*—Oliff & Berridge, PLC

(57) ABSTRACT

A drive device includes an input shaft connected to an engine; a first rotating electrical machine and a second rotating electrical machine; a differential gear unit including a first rotating element, a second rotating element, and a third rotating element; and a control device. The first rotating electrical machine and the differential gear unit are positioned coaxially with the input shaft. The first rotating electrical machine and the second rotating electrical machine are positioned on different axes from each other so as to axially overlap each other. A first component of the control device is positioned lower than the first rotating electrical machine and positioned so that at least a part of the first component overlaps the first rotating electrical machine when viewed in a vertical top plan view.

19 Claims, 6 Drawing Sheets

DRIVE DEVICE

CROSS-REFERENCE TO RELATED APPLICATION

The disclosure of Japanese Patent Application No. 2008-117399 filed on Apr. 28, 2008, including the specification, drawings and abstract is incorporated herein by reference in its entirety.

BACKGROUND

The present invention relates to a drive device.

In recent years, so-called hybrid vehicles having an engine and rotating electrical machines such as a generator and a motor as a driving force source of a vehicle have attracted attention in terms of fuel economy and environmental protection. A drive device for such hybrid vehicles requires a control device for controlling the rotating electrical machines. The rotating electrical machines and the control device are operated in combination and are connected through connection members such as power cables. For convenience of mounting on a vehicle, it is desirable to integrate the rotating electrical machines and the control device in one case. For example, Japanese Patent Application Publication No. JP-A-2004-343845 (Paragraph 0022, FIG. 1) discloses a drive device in which an inverter case accommodating a control device is integrally provided on top of a drive device case accommodating two rotating electrical machines, a differential gear unit, and the like.

Japanese Patent Application Publication No. JP-A-2007-124764 (Paragraphs 0072-0077, FIG. 5) discloses a drive device as described below. This drive device includes: an input shaft connected to an engine; two rotating electrical machines; a differential gear unit having three rotating elements respectively connected to one of the two rotating electrical machines, the input shaft, and an output rotating element; and a control device for controlling the rotating electrical machines. Regarding an arrangement of components of the drive device, Japanese Patent Application Publication No. JP-A-2007-124764 (Paragraphs 0072-0077, FIG. 5) discloses that the two rotating electrical machines, the differential gear unit, and the input shaft are arranged coaxially, and components of the control device such as an inverter unit, a reactor, and a capacitor are arranged above the drive device. The control device is positioned so as to axially overlap one of the rotating electrical machines. The capacitor and the reactor, which are relatively large components among the components of the control device, are positioned on the opposite sides to each other with respect to a vertical plane extending through a rotation axis of the rotating electrical machine, whereby these relatively large components can be efficiently accommodated in a drive device case.

SUMMARY

In the drive device of Japanese Patent Application Publication No. JP-A-2004-343845, however, the control device is positioned on top of the drive device case, whereby the overall vertical dimension of the drive device is increased. When such a drive device is mounted on a vehicle, equipment such as a battery and an air cleaner, which are usually positioned above the drive device, needs to be moved to other positions in order to prevent interference with the control device. Accordingly, there has been a problem in that sufficient compatibility cannot be obtained with normal engine-driven drive devices that do not require the control device for controlling the rotating electrical machines.

In the drive device of Japanese Patent Application Publication No. JP-A-2007-124764, on the other hand, the control device is positioned above the drive device case, but the capacitor and the reactor of the control device are positioned with respect to the rotating electrical machine so as to be efficiently accommodated in the drive device case, whereby an increase in dimension toward above the drive device is suppressed. In this drive device, however, the two rotating electrical machines are positioned coaxially. It is therefore necessary to increase the diameter or axial length of the rotating electrical machines in order to increase the rotation driving force that can be output from the rotating electrical machines. However, increasing the diameter of the rotating electrical machines increases the overall radial dimension of the drive device, and increasing the axial length of the rotating electrical machines increases the overall axial dimension of the drive device. In either case, there has been a limit in integrating the control device into the drive device while reducing the overall size of the drive device.

The present invention was made in view of the above problems and it is an object of the present invention to provide a drive device capable of integrating the control device while reducing the overall size of the drive device. The present invention can also achieve various other advantages.

According to an exemplary aspect of the invention, a drive device includes an input shaft connected to an engine; a first rotating electrical machine and a second rotating electrical machine; a differential gear unit including a first rotating element connected to the first rotating electrical machine, a second rotating element connected to the input shaft, and a third rotating element serving as an output rotating element; and a control device that controls the first rotating electrical machine and the second rotating electrical machine. The first rotating electrical machine and the differential gear unit are positioned coaxially with the input shaft. The first rotating electrical machine and the second rotating electrical machine are positioned on different axes from each other so as to axially overlap each other. A first component of the control device is positioned lower than the first rotating electrical machine and positioned so that at least a part of the first component overlaps the first rotating electrical machine when viewed in a vertical top plan view.

BRIEF DESCRIPTION OF THE DRAWINGS

Various exemplary aspects of the invention will be described with reference to the drawings, wherein.

DETAILED DESCRIPTION OF EMBODIMENTS

Figure 1:
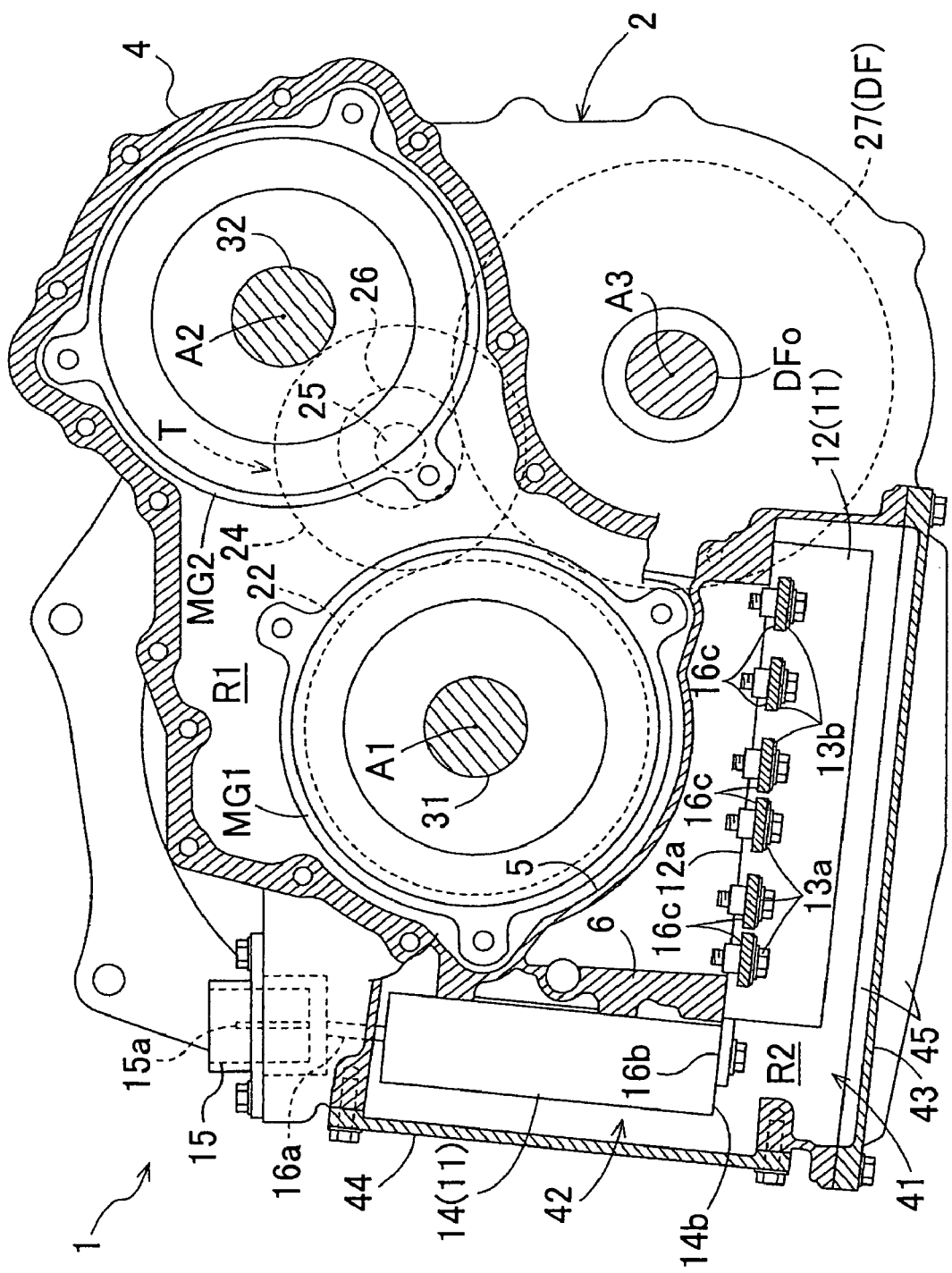
FIG. 1 is a cross-sectional view of a drive device according to an embodiment of the present invention taken along a plane perpendicular to an axial direction of the drive device.
Figure 2:
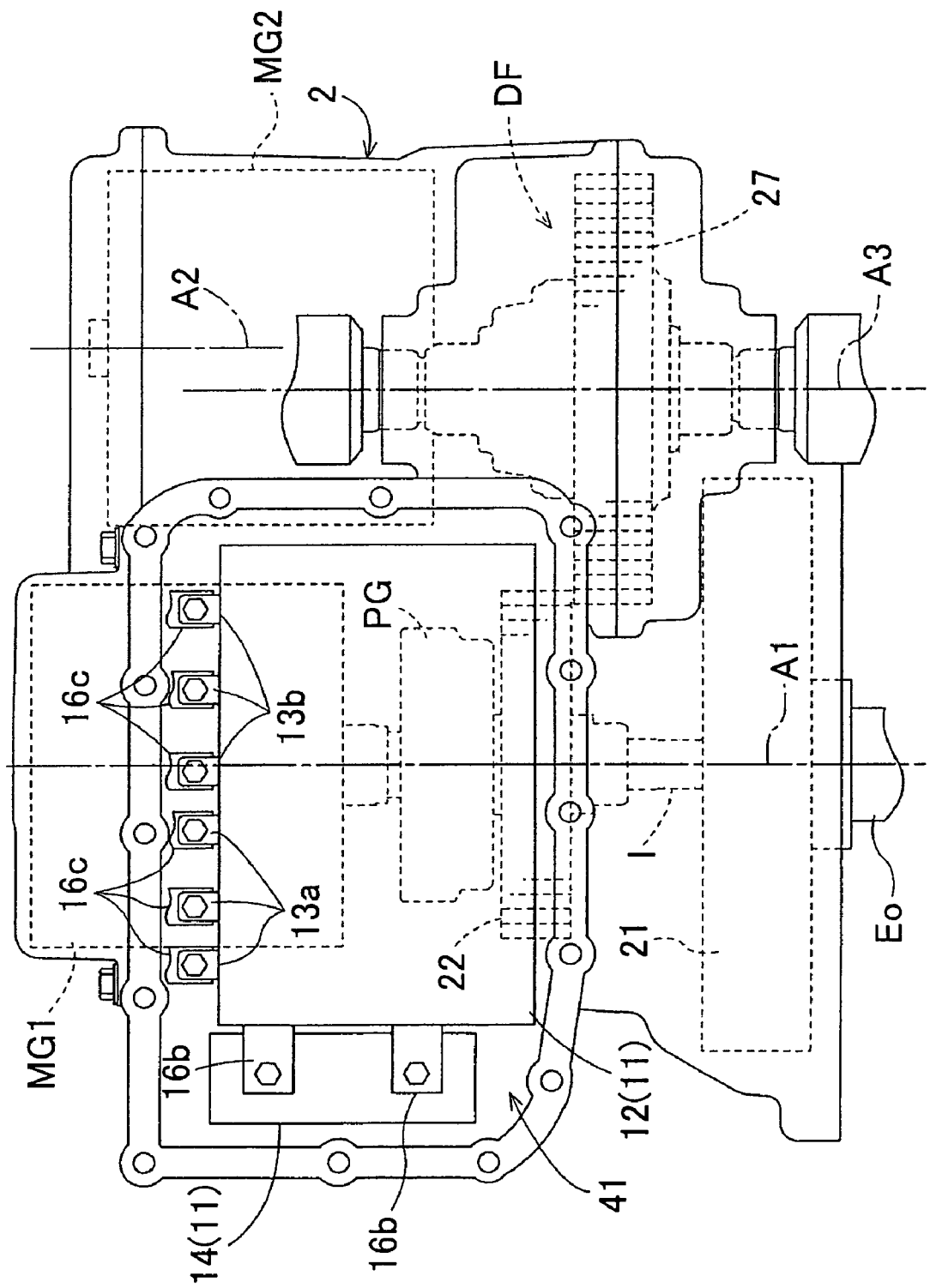
FIG. 2 is a bottom view of the drive device according to the embodiment of the present invention when viewed from under a first axis.
Figure 3:
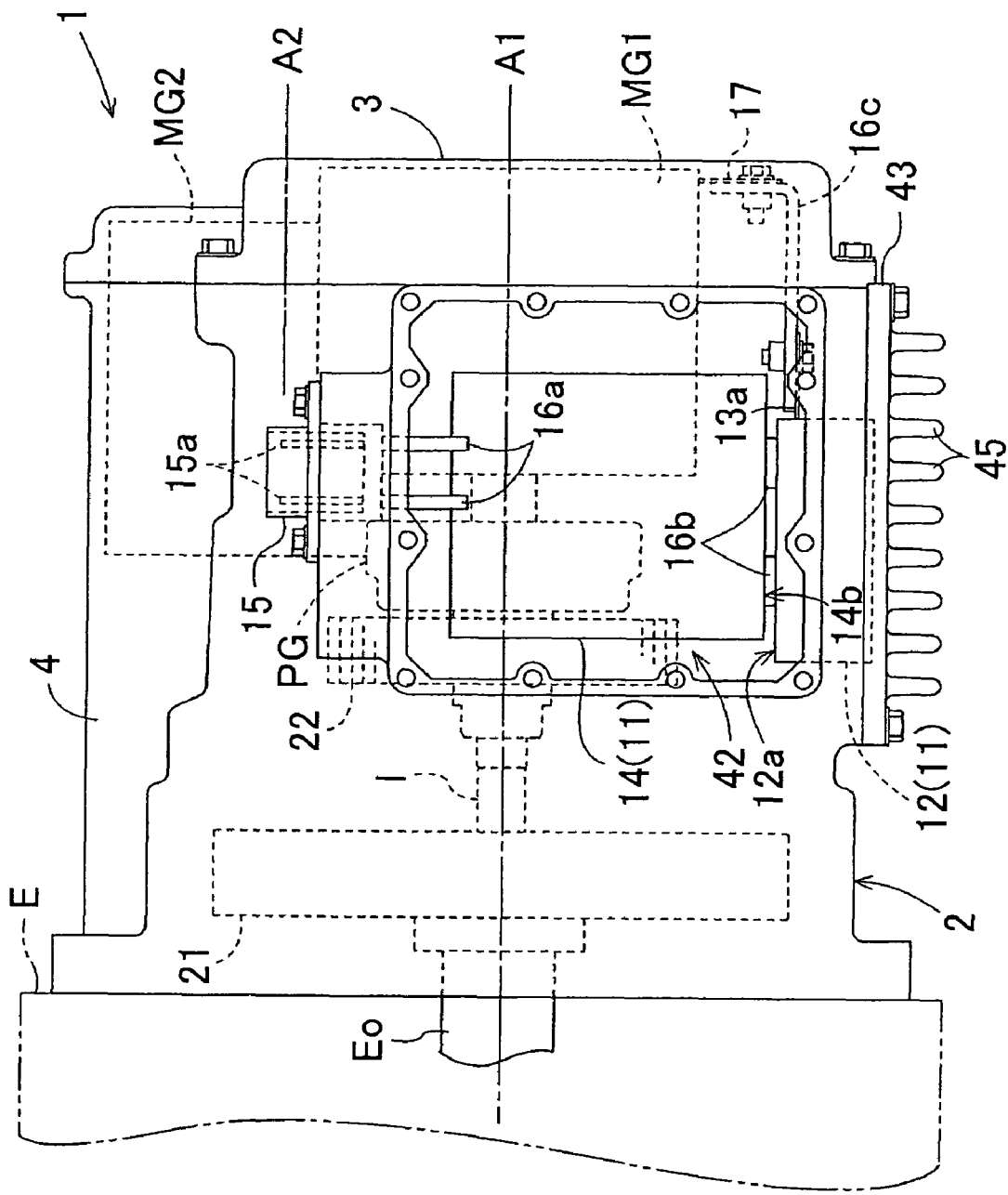
FIG. 3 is a side view of the drive device according to the embodiment of the present invention when viewed from a lateral side of the first axis.
Figure 4:
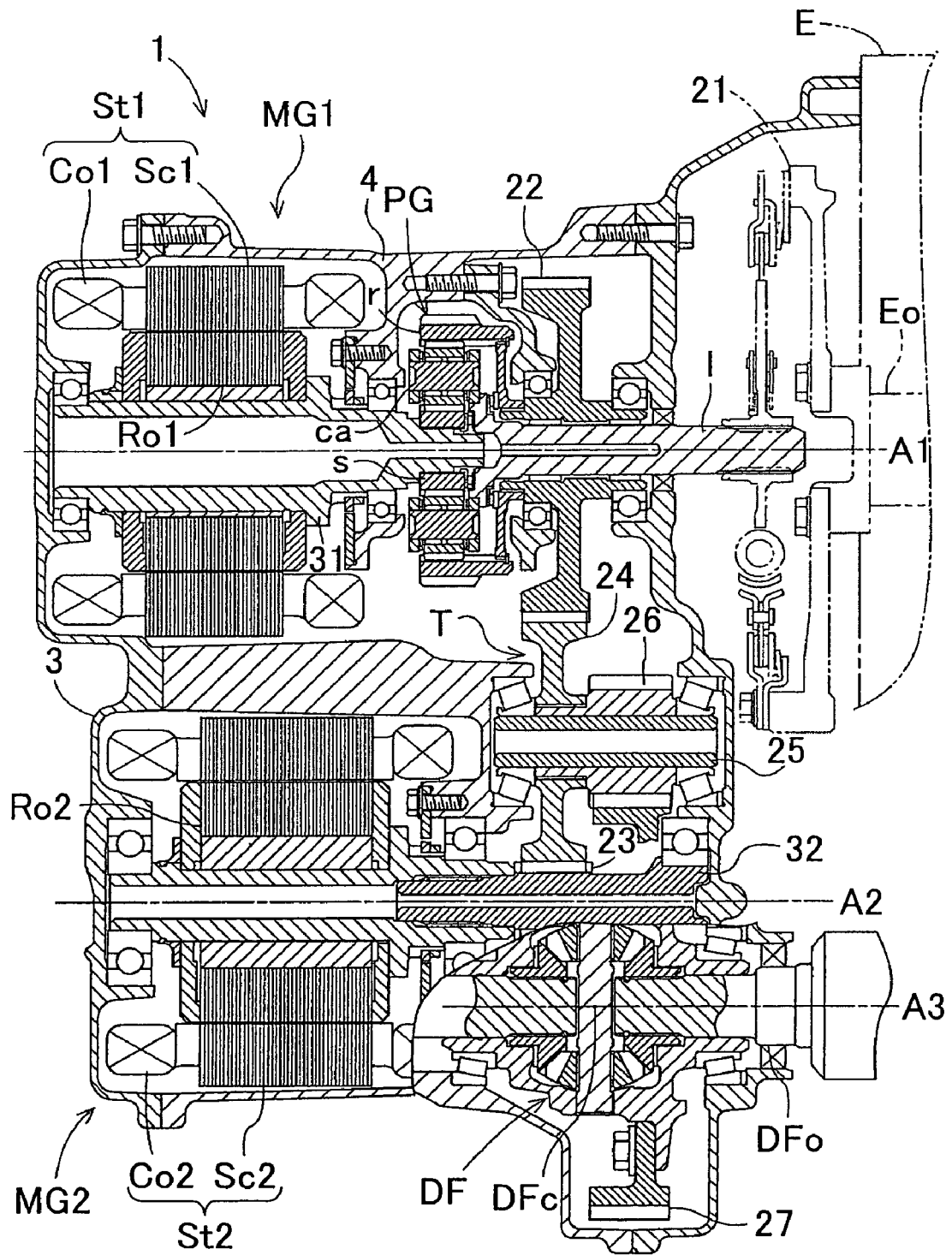
FIG. 4 is a developed cross-sectional view of the drive device according to the embodiment of the present invention.
Figure 5:
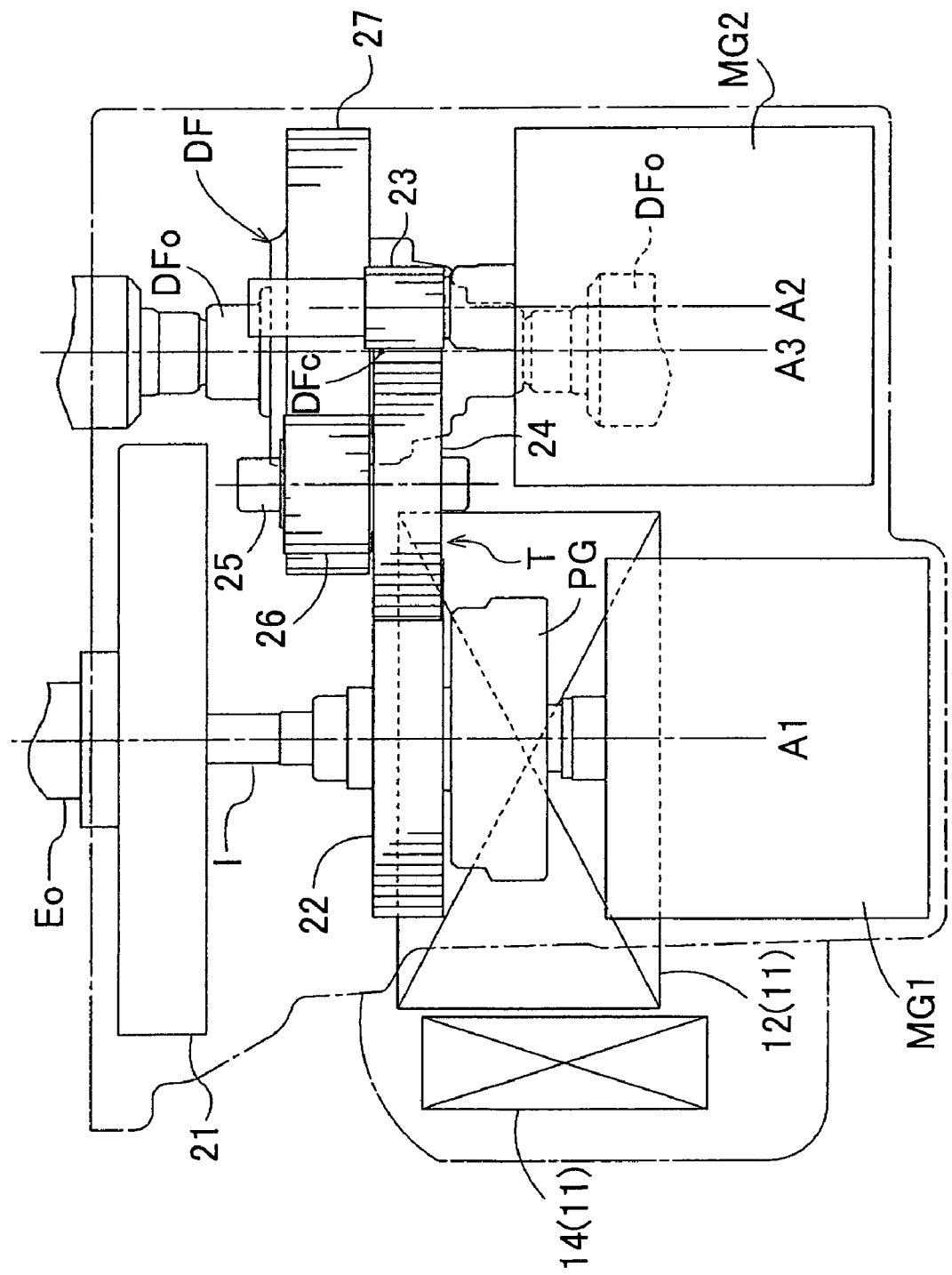
FIG. 5 is a diagram schematically showing arrangement of components when the drive device is viewed from above.
Figure 6:
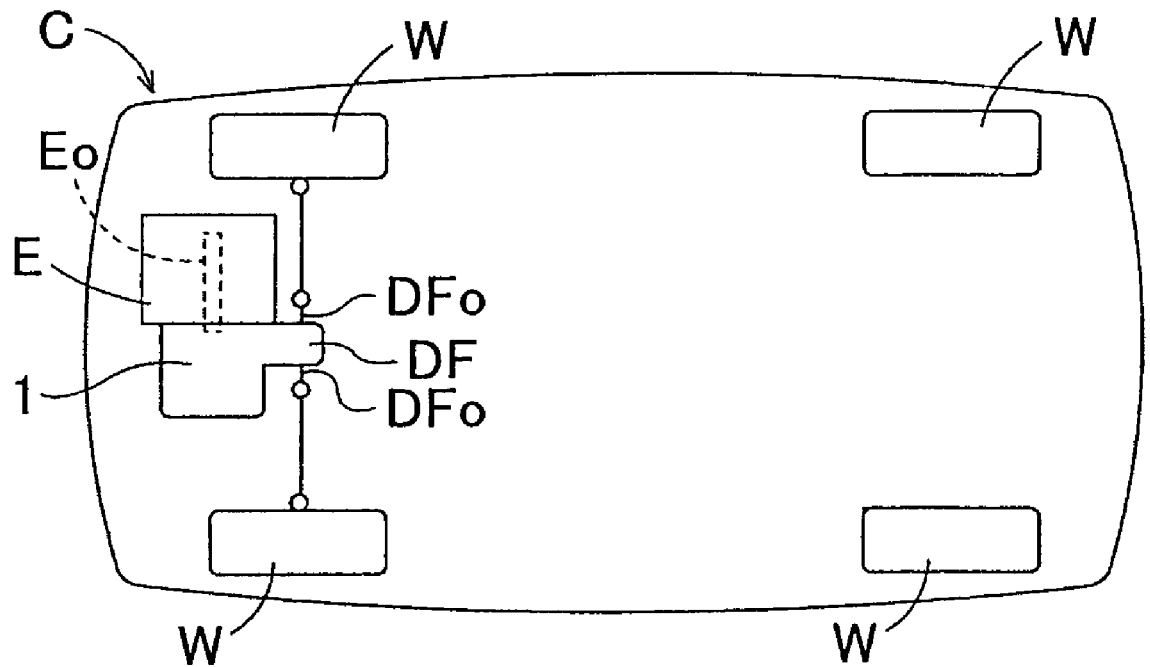
FIG. 6 is a diagram schematically showing an arrangement of the drive device in a vehicle.

Hereinafter, an embodiment of a drive device 1 according to the present invention will be described with reference to the accompanying drawings. In the present embodiment, description will be given to an example in which the drive device 1 of the present invention is applied to an FF (Front Engine Front Drive) vehicle. FIG. 1 is a cross-sectional view of the drive device 1 of the embodiment of the present invention taken along a plane perpendicular to an axial direction of the drive device 1. FIG. 2 is a bottom view of the drive device 1 of the embodiment of the present invention when viewed from under a first axis A1. FIG. 3 is a side view of the drive device 1 of the embodiment of the present invention when viewed from a lateral side of the first axis A1. FIG. 4 is a developed cross-sectional view of the drive device 1 of the embodiment of the present invention. FIG. 5 is a diagram schematically showing arrangement of components when the drive device 1 is viewed from above. FIG. 6 is a diagram schematically showing arrangement of the drive device 1 in a vehicle C.

1. Overall Structure of the Drive Device

First, the overall structure of the drive device 1 of the present embodiment will be described. As shown in FIG. 6, the drive device 1 of the present embodiment is positioned adjacent to an engine E in a width direction of the vehicle C and is connected in an axial direction of an output shaft Eo of the engine E. The engine E is transversely mounted on the vehicle C. A rotation driving force applied from the output shaft Eo of the engine E (or a rotation driving force generated by rotating electrical machines MG) is transmitted to driving wheels W through an output shaft DFo of a driving output device DF of the drive device 1, thereby enabling the vehicle C to travel. Note that, in the illustrated example, the output shaft DFo of the driving output device DF is positioned rearward of the output shaft Eo of the engine E (an input shaft I of the drive device 1 (see FIG. 4)) in a longitudinal direction of the vehicle C. However, the output shaft DFo of the driving output device DF may be positioned forward of the output shaft Eo of the engine E (the input shaft I of the drive device 1).

FIG. 1 is a cross-sectional view of the drive device 1 mounted on the vehicle C taken along a plane perpendicular to an axial direction of the drive device 1. In the following description, the up-down direction in FIG. 1 is regarded as a vertical direction. As shown in FIG. 1, the drive device 1 includes two rotating electrical machines MG, that is, a first rotating electrical machine MG1 and a second rotating electrical machine MG2, and the driving output device DF. Note that FIG. 1 shows only the outer shapes of these components, and detailed shapes thereof are omitted. The first rotating electrical machine MG1, the second rotating electrical machine MG2, and the driving output device DF are positioned radially adjacent to each other so that the lines connecting their respective axes form a triangle. The axis of the first rotating electrical machine MG1 (i.e., a rotation shaft 31 of a rotor Ro1 of the first rotating electrical machine MG1 (see FIG. 4)) is herein referred to as the first axis A1, the axis of the second rotating electrical machine MG2 (i.e., a rotation shaft 32 of a rotor Ro2 of the second rotating electrical machine MG2 (see FIG. 4)) is referred to as a second axis A2, and the axis of the driving output device DF (the output shaft DFo of the driving output device DF) is referred to as a third axis A3. The first axis A1, the second axis A2, and the third axis A3 are positioned in parallel with each other. Note that, in the following description, the term "axial direction" or "axially" means the direction parallel to the first axis A1, the second axis A2, and the third axis A3 (the direction perpendicular to the plane of the paper of FIG. 1). The first rotating electrical machine MG1, the second rotating electrical machine MG2, and the driving output device DF are accommodated in a machine chamber R1 of a case 2.

The drive device 1 further includes a control device 11 for controlling the first rotating electrical machine MG1 and the second rotating electrical machine MG2. The control device 11 includes at least an inverter unit 12 and a smoothing capacitor 14. The smoothing capacitor 14 smoothes power supply received from a battery (not shown) as a power supply device and supplies the smoothed power supply to the inverter unit 12. The inverter unit 12 includes a bridge circuit formed by at least three sets of switching elements, that is, at least six switching elements, and performs conversion between direct current power and alternating current power. These components of the control device 11 are electrically connected to each other through bus bars 16a, 16b. The drive device 1 further includes a connector 15 for electrically connecting the control device 11 and the battery to each other. The inverter unit 12 and the smoothing capacitor 14 are accommodated in an electric chamber R2 of the case 2. The case 2 has an outer peripheral wall 4 and a partition wall 5 and is divided into the machine chamber R1 and the electric chamber P2 by the partition wall 5. The machine chamber R1 and the electric chamber R2 are separated from each other in a fluid-tight manner. In the present embodiment, the machine chamber R1 and the electric chamber R2 therefore correspond to a "first chamber" and a "second chamber," respectively.

2. Structure of the Case

Hereinafter, the structure of the case 2 will be described. As shown in FIG. 1, the case 2 includes the machine chamber R1 accommodating the first rotating electrical machine MG1, the second rotating electrical machine MG2, and the like, and the electric chamber R2 accommodating the inverter unit 12 and the smoothing capacitor 14 of the control device 11, and the like. The machine chamber R1 and the electric chamber R2 are separated from each other by the partition wall 5. More specifically, the partition wall 5 separates the machine chamber R1 and the electric chamber R2 from each other in a radial direction of the first rotating electrical machine MG1. The electric chamber R2 is formed outside the machine chamber R1 in the radial direction of the first rotating electrical machine MG1.

The outer peripheral wall 4 that forms the outer shape of the case 2 is formed in a deformed cylindrical shape having an axis substantially in parallel with the respective axes (the first axis A1, the second axis A2, and the third axis A3) of the first rotating electrical machine MG1, the second rotating electrical machine MG2, and the driving output device DF. The machine chamber R1 occupies the most part of the inside of the case 2, and the shape of the machine chamber R1 corresponds to the shape of the outer peripheral wall 4. The machine chamber R1 thus has a deformed cylindrical shape having an axis substantially in parallel with the respective axes (the first axis A1, the second axis A2, and the third axis A3) of the first rotating electrical machine MG1, the second rotating electrical machine MG2, and the driving output device DF and surrounding the respective outer shapes of the first rotating electrical machine MG1, the second rotating electrical machine MG2, and the driving output device DF. The electric chamber R2 is formed so as to surround a part of the radial outer periphery of the machine chamber R1. The electric chamber R2 is positioned outside the partition wall 5 extending in an arc shape along the outer shape of the first rotating electrical machine MG1, and extends in a circumferential direction of the axial center of the first rotating electrical machine MG1. An auxiliary partition wall 6 is formed in the electric chamber R2. The auxiliary partition wall 6 extends substantially vertically downward from the partition wall 5 in the outermost peripheral portion on one side of the first rotating electrical machine MG1 (on the left side in FIG. 1) in the horizontal direction (the right-left direction in FIG. 1). The electric chamber R2 thus forms a space having a substantially L-shaped cross section when viewed from the axial direction (the direction shown in FIG. 1).

In the electric chamber R2, the inverter unit 12 is held substantially horizontally under the first rotating electrical machine MG1 in the vertical direction (the up-down direction in FIG. 1). The smoothing capacitor 14 is held substantially vertically on a lateral side of the first rotating electrical machine MG1 in the horizontal direction, that is, on the opposite side to the driving output device DF with respect to a vertical plane extending through a rotation axis of the first rotating electrical machine MG1. The inverter unit 12 and the smoothing capacitor 14 are positioned with their respective one ends located adjacent to each other. The connector 15 for electrically connecting the inverter unit 12 and the smoothing capacitor 14 of the control device 11 to the battery is provided above the smoothing capacitor 14. The connector 15 is supported so as to extend from the electric chamber R2 through the case 2 and to be exposed to the outside of the case 2.

As shown in FIG. 2, the inverter unit 12 includes three terminals 13a respectively connected to three-phase coils, that is, U-phase, V-phase, and W-phase coils, of the first rotating electrical machine MG1, and three terminals 13b respectively connected to three-phase coils, that is, U-phase, V-phase, and W-phase coils, of the second rotating electrical machine MG2. The terminals 13a, 13b of the inverter unit 12 are respectively connected to the three-phase coils of the first rotating electrical machine MG1 and the second rotating electrical machine MG2 through bus bars 16c (see FIG. 3). The inverter unit 12 thus converts direct current power received from the battery to alternating current power, and supplies the alternating current power to the three-phase coils of the first rotating electrical machine MG1 and the second rotating electrical machine MG2. The inverter unit 12 also receives alternating current power generated by the first rotating electrical machine MG1 and the second rotating electrical machine MG2 from the three-phase coils of these rotating electrical machines MG, converts the received alternating current power to direct current power, and supplies the direct current power to the battery. Note that FIG. 3 only shows connection between the inverter unit 12 and the first rotating electrical machine MG1 through the bus bars 16c, and connection between the inverter unit 12 and the second rotating electrical machine MG2 is omitted in FIG. 3.

As shown in FIG. 1, the electric chamber R2 has a first opening 41 that opens downward and a second opening 42 that opens laterally. The first opening 41 and the second opening 42 are formed in the outer peripheral wall 4 of the case 2. The first opening 41 is an opening formed in order to facilitate assembling of the inverter unit 12 located under the first rotating electrical machine MG1 in the electric chamber R2 to the case 2 and to facilitate maintenance and inspection, and the like. As shown in FIG. 2, the planar shape of the first opening 41 is therefore larger than that of the inverter unit 12 when viewed from under the case 2. The inverter unit 12 can thus be accommodated in the electric chamber R2 through the first opening 41 and fixed to the case 2. The first opening 41 is covered by a first cover 43. The first cover 43 is attached to the outer peripheral wall 4 of the case 2 so as to entirely cover the first opening 41. The first cover 43 has fins 45 on its both surfaces. Since the first cover 43 provided so as to face the inverter unit 12 has such fins 45, heat generated by the inverter unit 12 can be efficiently released to the outside.

The second opening 42 is an opening formed in order to facilitate assembling of the smoothing capacitor 14 located on the lateral side of the first rotating electrical machine MG1 in the electric chamber R2 to the case 2 and to facilitate maintenance and inspection, and the like. As shown in FIG. 3, the planar shape of the second opening 42 is therefore larger than that of the smoothing capacitor 14 when viewed from a lateral side of the case 2. The smoothing capacitor 14 can thus be accommodated in the electric chamber R2 through the second opening 42 and fixed to the case 2. The second opening 42 is covered by a second cover 44. The second cover 44 is attached to the outer peripheral wall 4 of the case 2 so as to entirely cover the second opening 42.

The machine chamber R1 and the electric chamber R2 are physically separated from each other in the case 2 by the partition wall 5. Although not shown in the figure, the machine chamber R1 and the electric chamber R2 are separated from each other in a fluid-tight manner by a cover 3 (see FIGS. 3 and 4) abutting on opening end faces of the machine chamber R1 and the electric chamber R2 of the case 2. It is preferable to provide a liquid gasket or the like between the cover 3 and the opening end faces of the machine chamber R1 and the electric chamber R2 because the liquid-tight property is increased. Since the machine chamber R1 and the electric chamber R2 are thus separated from each other in a fluid-tight manner, a lubricant can be properly supplied to components that requires cooling and lubrication, such as the first rotating electrical machine MG1, the second rotating electrical machine MG2, the planetary gear unit PG, and the driving output device DF, while preventing the lubricant from entering the electric chamber R2. Electric insulation between the inverter unit 12 and the smoothing capacitor 14 accommodated in the electric chamber R2 can thus be easily ensured.

3. Structure of a Driving Mechanism

Hereinafter, the structure of a driving mechanism included in the drive device 1 of the present embodiment will be described. As shown in FIG. 4, the first rotating electrical machine MG1 and the rotation shaft 31 of the rotor Ro1 thereof, the input shaft I connected to the output shaft Eo of the engine E, and the planetary gear unit PG for transmitting rotation of the first rotating electrical machine MG1 and the input shaft I to the driving output device DF side are positioned on the first axis A1.

The input shaft I is connected to the output shaft Eo of the engine E. The engine E is an internal combustion engine that is driven by burning fuel. For example, various known engines such as a gasoline engine and a diesel engine can be used as the engine E. A damper 21 is inserted between the output shaft Eo of the engine E and the input shaft I of the drive device 1. The damper 21 transmits a rotation driving force of the engine E to the input shaft I while absorbing torsional vibration between the output shaft Eo and the input shaft I, and applies the resultant rotation driving force to the drive device 1.

The first rotating electrical machine MG1 has a stator St1 fixed to the case 2 and the rotor Ro1 rotatably supported radially inside the stator St1. The stator St1 has a stator core Sc1 and a coil Co1 wound around the stator core Sc1. The rotation shaft 31 of the rotor Ro1 of the first rotating electrical machine MG1 is connected so as to rotate integrally with a sun gear s of the planetary gear unit PG. The first rotating electrical machine MG1 functions mainly as a generator for generating electric power by rotation transmitted through the rotation shaft 31 of the rotor Ro1. Note that the first rotating electrical machine MG1 functions also as a motor depending on the relation between the rotation direction and the direction of the rotation driving force.

The second rotating electrical machine MG2 has a stator St2 fixed to the case 2 and the rotor Ro2 rotatably supported radially inside the stator St2. The stator St2 has a stator core Sc2 and a coil Co2 wound around the stator core Sc2. The rotation shaft 32 of the rotor Ro2 of the second rotating electrical machine MG2 is connected so as to rotate integrally with a second-rotating-electrical-machine output gear 23. The second rotating electrical machine MG2 functions mainly as a motor for generating torque by generating rotation. The torque generated by rotation of the second rotating electrical machine MG2 is transmitted to the second-rotating-electrical-machine output gear 23 through the rotation shaft 32 of the rotor Ro2. Note that although the second rotating electrical machine MG2 functions mainly as a motor, the second rotating electrical machine MG2 functions also as a generator during, for example, regenerative braking for decelerating the vehicle C.

When functioning as a generator, the first rotating electrical machine MG1 and the second rotating electrical machine MG2 supply generated electric power to the battery to charge the battery, or supply the electric power to the other rotating electrical machine MG functioning as a motor to power the other rotating electrical machine MG. When functioning as a motor, the first rotating electrical machine MG1 and the second rotating electrical machine MG2 are charged by the battery, or is powered by receiving the electric power generated by the other rotating electrical machine MG functioning as a generator.

The planetary gear unit PG is positioned coaxially with the input shaft I and includes three rotating elements, that is, a first rotating element, a second rotating element, and a third rotating element. In the present embodiment, the planetary gear unit PG is a single-pinion type planetary gear unit PG having a carrier ca rotatably supporting a plurality of pinion gears, the sun gear s meshing with the pinion gears, and a ring gear r. In the present embodiment, the planetary gear unit PG corresponds to a "differential gear unit" of the present invention. Provided that the three rotating elements of the planetary gear unit GP are sequentially referred to as the first rotating element, the second rotating element, and the third rotating element in the order of the rotational speed, the sun gear s corresponds to the "first rotating element," the carrier ca corresponds to the "second rotating element," and the ring gear r corresponds to the "third rotating element" of the present invention.

The sun gear s is connected so as to rotate integrally with the first rotating electrical machine MG1 through the rotation shaft 31 of the rotor Ro1. The carrier ca is connected so as to rotate integrally with the input shaft I. The ring gear r serves as an output rotating element, and rotates integrally with a counter drive gear 22. The counter drive gear 22 is provided coaxially with the input shaft I and is positioned axially closer to the engine E than the ring gear r is. The planetary gear unit PG functions as a power distribution differential gear unit for distributing the rotation driving force from the input shaft I to the ring gear r serving as an output rotating element and to the first rotating electrical machine MG1. The planetary gear unit PG transmits a rotation driving force determined as described below toward the driving output device DF through the counter drive gear 22 rotating integrally with the ring gear r. This rotation driving force is determined based on the respective rotation driving forces applied from the first rotating electrical machine MG1 and the input shaft I and the gear ratio (the ratio of the number of teeth of the sun gear s to the number of teeth of the ring gear r=[the number of teeth of the sun gear s]/[the number of teeth of the ring gear r]).

The drive device 1 further includes a counter gear mechanism T for transmitting rotation of the counter drive gear 22 to the driving output device DF. The counter gear mechanism T has a counter driven gear 24 meshing with the counter drive gear 22, a final drive gear 26 meshing with a final driven gear 27 of the driving output device DF, and a counter shaft 25 connecting the counter driven gear 24 and the final drive gear 26. The counter shaft 25 is positioned in parallel with the input shaft I, and the final drive gear 26 is positioned axially closer to the engine E than the counter driven gear 24 is. The second-rotating-electrical-machine output gear 23 meshes with the counter driven gear 24. Rotation of the counter drive gear 22 and rotation of the second-rotating-electrical-machine output gear 23 are thus transmitted to the counter driven gear 24.

The rotation transmitted to the counter driven gear 24 is transmitted to the final drive gear 26 through the counter shaft 25. The driving output device DF has the final driven gear 27 meshing with the final drive gear 26. The driving output device DF distributes a rotation driving force transmitted to the final driven gear 27 to the two driving wheels W through the output shaft DFo. The driving output device DF thus functions as a driving output differential gear unit for distributing output to the two driving wheels W. In the present embodiment, the final driven gear 27 of the driving output device DF corresponds to an "input gear," and the output shaft DFo of the driving output device DF corresponds to an "output shaft" of the present invention. Note that, in the present embodiment, respective rotation axes of the final driven gear 27 and the output shaft DFo match each other. In other words, in the present embodiment, the third axis A3 is also the rotation axis of the final driven gear 27.

The drive device 1 of the present embodiment thus transmits rotation generated by the engine E, the first rotating electrical machine MG1, and the second rotating electrical machine MG2 to the two driving wheels W through the counter gear mechanism T, the driving output device DF, and the output shaft DFo, thereby enabling the vehicle C to travel. More specifically, the operation mode can be switched to a motor drive mode in which only the second rotating electrical machine MG2 is driven, a hybrid drive mode in which all of the engine E, the first rotating electrical machine MG1, and the second rotating electrical machine MG2 are driven, or the like to enable the vehicle C to travel.

4. Arrangement of Components

Hereinafter, arrangement of components in the drive device 1, which is a main part of the present invention, will now be described. The following description will focus on arrangement of the first axis A1, the second axis A2, and the third axis A3 in the case 2, arrangement in the axial direction, and arrangement of components of the control device.

4-1. Arrangement of the Three Axes

As shown in FIG. 1, the first rotating electrical machine MG1, the second rotating electrical machine MG2, and the driving output device DF are positioned radially adjacent to each other in the machine chamber R1 of the case 2. As described before, in the present embodiment, the axis of the input shaft I and the axis of the first rotating electrical machine MG1 (the rotation shaft 31 of the rotor Ro1 of the first rotating electrical machine MG1) form the first axis A1. The axis of the second rotating electrical machine MG2 (the rotation shaft 32 of the rotor Ro2 of the second rotating electrical machine MG2) forms the second axis A2. The axis of the driving output device DF (the output shaft DFo of the driving output device DF and the rotation axis of the final driven gear 27) form the third axis A3. The first axis A1, the second axis A2, and the third axis A3 are positioned in parallel with each other so that the lines connecting these axes form a triangle when viewed in the axial direction.

More specifically, the axes A2 and A3 are positioned as follows with respect to the first axis A1: in the vertical direction, the second axis A2 is located above a horizontal plane extending through the first axis A1, and the third axis A3 is located below the horizontal plane extending through the first axis A1. The rotation axis of the final driven gear 27 and the output shaft DFo of the driving output device DF are therefore located lower than the input shaft I. The rotation shaft of the second rotating electrical machine MG2 is located higher than the input shaft I.

In the horizontal direction, the second axis A2 and the third axis A3 are located on one side (on the right side in FIG. 1) of a vertical plane extending through the first axis A1. The rotation shaft 32 of the second rotating electrical machine MG2 is therefore located on the same side as the output shaft DFo with respect to a vertical plane extending through the input shaft I. In the illustrated example, the second axis A2 is displaced slightly toward one side (toward the right side in FIG. 1) from the third axis A3.

The output shaft DFo of the driving output device DF is thus located lower than the input shaft I and on one side of the vertical plane extending through the input shaft I. A space is therefore produced in a region located above the driving output device DF and horizontally overlapping the first rotating electrical machine MG1. The space in the drive device 1 can therefore be effectively used by positioning the second rotating electrical machine MG2 in this space.

4-2. Arrangement in the Axial Direction

As shown in FIGS. 4 and 5, the input shaft I, the planetary gear unit PG, and the first rotating electrical machine MG1 are sequentially arranged on the first axis A1 in this order from the side to which the engine E is connected. In other words, the first rotating electrical machine MG1, the planetary gear unit PG, and the input shaft I are sequentially arranged on the first axis A1 in this order from the opposite side to the side to which the engine E is connected. In the present embodiment, the counter drive gear 22 is positioned axially closer to the engine E than the ring gear r of the planetary gear unit PG is. The final drive gear 26 is positioned axially closer to the engine E than the counter driven gear 24 meshing with the counter drive gear 22 is. The final driven gear 27 of the driving output device DF meshes with the final drive gear 26. The driving output device DF and the first rotating electrical machine MG1 can thus be positioned spaced apart from each other so as not to overlap each other in the axial direction. Since these relatively large components are thus axially displaced from each other, radial increase in size of the drive device 1 is prevented, whereby the overall size of the drive device 1 can be reduced. Note that, in this structure, the driving output device DF can be positioned on the engine E side in the axial direction. In this case, when the drive device 1 is mounted on the vehicle C, the driving output device DF is positioned near the center of the vehicle C in the width direction in view of the balance in size between the engine E and the drive device 1 (see FIG. 6). This structure is preferable because balanced arrangement can be implemented in the width direction of the vehicle C.

In the present embodiment, as shown in FIGS. 4 and 5, the final driven gear 27 is positioned on the opposite side to the inverter unit 12 with respect to a central part DFc of the driving output device DF. In this case, the final driven gear 27 is positioned on the engine E side in the axial direction, and the central part DFc of the driving output device DF and the inverter unit 12 are positioned on the opposite side to the engine E with respect to the final driven gear 27. As shown in FIG. 2, a main body of the driving output device DF and the inverter unit 12 are positioned so as to overlap each other in the axial direction. In the present embodiment, the final driven gear 27 has the largest outer diameter in the driving output device DF. In this case, the use of the above arrangement reduces limitation on arrangement of the inverter unit 12 due to interference with the final driven gear 27, as compared to the case where the inverter unit 12 and the final driven gear 27 are positioned on the same side with respect to the central part DFc of the driving output device DF. As a result, the axial dimension of the inverter unit 12 can be increased while reducing the overall axial length of the driving device 1.

As shown in FIG. 4, the final drive gear 26 is positioned closer to the engine E than the counter driven gear 24 is in the rotation axis direction of the counter shaft 25 of the counter gear mechanism T. Since the final drive gear 26 meshing with the final driven gear 27 of the driving output device DF is located on the engine E side, the final driven gear 27 can be positioned close to the engine E, whereby the axial dimension of the inverter unit 12 can be increased.

The first rotating electrical machine MG1 and the second rotating electrical machine MG2 are positioned so as to overlap each other in the axial direction. In other words, the first rotating electrical machine MG1 and the second rotating electrical machine MG2 are positioned so as to overlap each other when viewed from a lateral side (the state viewed from the direction shown in FIG. 3). In the present embodiment, as shown in FIG. 4, the second rotating electrical machine MG2 is positioned slightly closer to the engine E in the axial direction than the first rotating electrical machine MG1 is. However, the two rotating electrical machines MG overlap each other substantially entirely in the axial direction. Since at least the first rotating electrical machine MG1 and the second rotating electrical machine MG2 overlap each other in the axial direction, the axial length of each rotating electrical machine MG can be increased while reducing the overall axial length of the drive device 1, as compared to the case where the rotating electrical machines MG are positioned coaxially. Accordingly, the diameter of each rotating electrical machine MG can be reduced while maintaining the rotation driving force that can be output from the rotating electrical machines MG at the same level as in conventional examples.

4-3. Arrangement of Components of the Control Device

In the present embodiment, as shown in FIGS. 1 and 3, the inverter unit 12 of the control device 11 is positioned under the first rotating electrical machine MG1. As shown in FIG. 5, the inverter unit 12 is positioned so that at least a part of the inverter unit 12 overlaps the first rotating electrical machine MG1 when viewed in a vertical top plan view. In the present embodiment, the inverter unit 12 corresponds to a "first component" in the present invention. As described before, in the present embodiment, the diameter of each rotating electrical machine MG can be reduced while maintaining the rotation driving force that can be output from the rotating electrical machines MG at the same level as in conventional examples.

Since the diameter of the rotating electrical machines MG is reduced, a space can be produced in a region radially outside the first rotating electrical machine MG1. The inverter unit 12, which is one of the components of the control device 11, is positioned in a part of the space, that is, under the first rotating electrical machine MG1. The space in the drive device 1 can thus be used effectively.

The inverter unit 12 is positioned so that at least a part of the inverter unit 12 overlaps the final driven gear 27 in the up-down direction (the up-down direction in FIG. 1). In other words, at least a part of the inverter unit 12 is located within a height range that is occupied by the final driven gear 27 in the up-down direction. In the illustrated example, the inverter unit 12 is positioned so that its upper end face 12a is located in a space between two upper and lower horizontal planes contacting the final driven gear 27. As described before, the rotation axis of the final driven gear 27 and the output shaft DFo of the driving output device DF are located lower than the input shaft I. A space is therefore produced in a region which is located under the first rotating electrical machine mG1 located coaxially with the input shaft I and which horizontally overlaps the driving output device DF and the final driven gear 27. The space in the drive device 1 can therefore be effectively used by positioning the inverter unit 12 in this space.

In the present embodiment, as shown in FIG. 1, the inverter unit 12 is positioned so that at least a part of the inverter unit 12 overlaps the final driven gear 27 when viewed from the rotation axis direction of the final driven gear 27. Accordingly, regarding the direction perpendicular to the axial direction on a horizontal plane, physical limitation in the drive device 1 is reduced by avoiding interference with at least a main body of the driving device output DF. The dimension of the inverter unit 12 in this direction can therefore be increased.

Moreover, in the space produced radially outside the first rotating electrical machine MG1 because of the reduced diameter of the rotating electrical machines MG, the smoothing capacitor 14, which is one of the components of the control device 11, is positioned so as to overlap the first rotating electrical machine MG1 in the up-down direction. At least a part of the smoothing capacitor 14 thus overlaps the first rotating electrical machine MG1 in the up-down direction. In other words, at least a part of the smoothing capacitor 14 is located within a height range that is occupied by the first rotating electrical machine MG1 in the up-down direction. In the illustrated example, the smoothing capacitor 14 is positioned so that its upper end face is located in a space between two upper and lower horizontal planes contacting the first rotating electrical machine MG1. In the present embodiment, the smoothing capacitor 14 corresponds to a "second component" in the present invention. The inverter unit 12 and the smoothing capacitor 14 are positioned axially adjacent to each other when viewed in a vertical top plan view, and the top end face 12a of the inverter unit 12 and a lower end face 14b of the smoothing capacitor 14 are held substantially flush with each other (see FIGS. 1 through 3). The inverter unit 12 and the smoothing capacitor 14 are thus positioned in a substantially L-shape in the electric chamber R2 when viewed in the axial direction so as to surround a part of the radial outer periphery of the first rotating electrical machine MG1 along the circumferential direction of the axial center of the first rotating electrical machine MG1. The smoothing capacitor 14 is positioned adjacent also to the connector 15 that is supported so as to extend from the electric chamber R2 through the case 2 and to have its upper end exposed to the outside of the case 2. The space in the drive device 1 can be used more effectively by using the above arrangement.

When viewed from the axial direction of the input shaft I, the inverter unit 12, the smoothing capacitor 14, and the connector 15 are provided in a space extending from under the input shaft I to the opposite side to the output shaft DFo with respect to the vertical plane extending through the input shaft I. The inverter unit 12 is positioned under the input shaft I. The smoothing capacitor 14 is positioned higher than the inverter unit 12 with their respective one ends located adjacent to each other. The connector 15 is positioned above the smoothing capacitor 14. The order of positioning these components corresponds to the order of positioning electric circuits for controlling the rotating electrical machines MG. In other words, these components are positioned in the order of the connector 15 connected to the battery, the smoothing capacitor 14, and the inverter unit 12. This reduces the wiring length for electrically connecting the components of the control device, thereby enabling reduction in power loss.

The inverter unit 12 is positioned under the rotating electrical machine MG1. Removing the first cover 43 therefore enables access to the inverter unit 12 through the first opening 41 formed in the lower part of the case 2. Maintenance, inspection, repair, and the like of the inverter unit 12 can thus be performed with improved workability. Moreover, the first cover 43 has the fins 45 on its both surfaces, whereby heat generated by the inverter unit 12 in the lower part of the electric chamber R2 is transmitted to the outside through the fins 45. The heat can be efficiently released to the outside by using cooling air flowing along the lower surface of the drive device 1.

As has been described above, according to the drive device 1 of the present embodiment, the components are arranged so as to make the most of the space in the drive device 1. The drive device 1 capable of integrating the control device 11 while enabling reduction in overall size of the drive device 1 can thus be provided.

Note that, referring to FIG. 1, the position of the inverter unit 12 corresponds to the position where a valve body for controlling an oil pressure to be supplied to a brake and a clutch is located in normal drive devices of an AT (Automatic Transmission) and a CVT (Continuously Variable Transmission), in view of the shape and the arrangement in the axial direction. Because of the improved shape compatibility with these drive devices, the drive device 1 of the present embodiment can be mounted on vehicles on which these driving devices are conventionally mounted. No movement of parts, for example, is specifically required to mount the drive device 1 on these vehicles. Note that the drive device 1 of the present embodiment can perform shifting by electrically controlling the rotational speed and the output torque of the first rotating electrical machine MG1 by the control device 11. Since no hydraulic control using a working fluid or the like is required, it is not necessary to provide a valve body separately. The overall size is therefore not increased.

The first rotating electrical machine MG1, the second rotating electrical machine MG2, and the planetary gear unit PG are respectively located at positions where a primary pulley, a secondary pulley, and a forward/rearward travel switching mechanism are located in drive devices of a CVT. Because of the highly improved shape compatibility with the drive devices of the CVT, the drive device 1 of the present embodiment can be mounted on vehicles on which the driving devices of the CVT are conventionally mounted. No movement of parts, for example, is specifically required to mount the drive device 1 on these vehicles.

Other Embodiments (1) In the present embodiment, description was given to an example in which the inverter unit 12 is provided as a first component of the control device 11, and the inverter unit 12 is positioned lower than the first rotating electrical machine MG1 and positioned so that at least a part of the inverter unit 12 overlaps the first rotating electrical machine MG1 when viewed in a vertical top plan view. Moreover, description was given to an example in which the smoothing capacitor 14 is provided as a second component of the control device 11 and is positioned so as to overlap the first rotating electrical machine MG1 in the up-down direction in the electric chamber R2. However, the arrangement of the components of the control device 11 is not limited to this. For example, the smoothing capacitor 14 may be positioned lower than the first rotating electrical machine MG1 and positioned so that at least a part of the smoothing capacitor 14 overlaps the first rotating electrical machine MG1 when viewed in a vertical top plan view, and the inverter unit 12 may be positioned so as to overlap the first rotating electrical machine MG1 in the up-down direction. This arrangement is also one of preferred embodiments of the present invention. In this case as well, a space produced radially outside the first rotating electrical machine MG1 because of the reduced diameter can be effectively used, whereby the overall size of the drive device 1 can be reduced.

(2) In the above embodiment, description was given to an example in which the control device 11 is formed by the inverter unit 12 and the smoothing capacitor 14. However, components such as a noise filter for removing power supply nose of the battery and a reactor that forms a booster circuit for boosting an input voltage from the battery may be provided as required in the electric chamber R2 as long as the space is available in the electric chamber R2, and these components may be used as a first component and a second component.

(3) In the above embodiment, description was given to an example in which the planetary gear unit PG having the sun gear s, the carrier ca, and the ring gear r is used as a differential gear unit. For example, however, a differential gear unit using a plurality of bevel gears meshing with each other may alternatively be used.

(4) In the above embodiment, description was given to an example in which a single-pinion type planetary gear unit PG in which the pinion gears supported by the carrier ca mesh with both the sun gear s and the ring gear r is used as a differential gear unit. However, a double-pinion type planetary gear unit PG may be used in which one of two pinion gears supported by a carrier ca and meshing with each other meshes with a sun gear s and the other meshes with a ring gear r.

(5) In the above embodiment, description was given to an example in which the drive device 1 of the present invention is applied to an FF (Front Engine Front Drive) vehicle. However, the present invention is suitable as a structure that can be used in the drive device 1 provided adjacent to the transversely mounted engine E in the width direction of the vehicle C and connected in the axial direction of the output shaft Eo of the engine E. It is also preferable to apply the present invention to, for example, an RR (Rear Engine Rear Drive) vehicle, an MR (Midship Engine Rear Drive) vehicle, and the like.

The present invention can be used for a drive device including: an input shaft connected to an engine; a first rotating electrical machine and a second rotating electrical machine; a differential gear unit including a first rotating element connected to the first rotating electrical machine, a second rotating element connected to the input shaft, and a third rotating element serving as an output rotating element; and a control device for controlling the first rotating electrical machine and the second rotating electrical machine.

Note that, in the present application, the term "rotating electrical machine" is used as a concept including a motor (electric motor), a generator (electric generator), and a motor-generator functioning both as a motor and a generator as needed. In the present specification, the rotating electrical machine is used as a general concept meaning one or both of the first rotating electrical machine and the second rotating electrical machine.

In the present application, the terms "connect" or "connection" are used as a concept including not only direct connection between members but also indirect connection between members through one or more members.

According to an exemplary aspect of the invention, the first rotating electrical machine and the second rotating electrical machine are positioned on different axes from each other so as to axially overlap each other. Accordingly, the axial length of each rotating electrical machine can be increased while reducing the overall axial length of the drive device, as compared to the case where the first rotating electrical machine and the second rotating electrical machine are positioned coaxially. As a result, the diameter of each rotating electrical machine can be reduced while maintaining the rotation driving force that can be output from the rotating electrical machines at the same level as in the conventional examples. A space can therefore be produced radially outside the rotating electrical machines because of the reduced diameter. The first component of the control device is positioned lower than the first rotating electrical machine in this space and positioned so that at least a part of the first component overlaps the first rotating electrical machine when viewed in a vertical top plan view. The space in the drive device can therefore be used effectively. The present invention can thus provide a drive device capable of integrating the control device while enabling a reduction in the overall size of the drive device.

The phrase "overlap the input gear in an up-down direction" herein means that at least a part of the first component is located within a height range that is occupied by the input gear in the up-down direction.

According to an exemplary aspect of the invention, in the structure of integrating the driving output device into the drive device, the output shaft for outputting the rotation driving force from the output rotating element of the differential gear unit through the driving output device is positioned lower than the input shaft. As a result, a space is produced in a region which is located under the first rotating electrical machine located coaxially with the input shaft and which is located within a height range that is occupied by the input gear of the driving output device in the up-down direction. By using the structure described above, the first component can be positioned in this space, whereby the space in the drive device can be used effectively. As a result, the overall size of the drive device can be reduced.

According to an exemplary aspect of the invention, in the case where the output shaft of the driving output device is positioned under the input shaft in the above structure of integrating the driving output device into the drive device, a space is produced in a region located above the driving output device and horizontally overlapping the first rotating electrical machine. By using the structure described above, the second rotating electrical machine can be positioned in this space, whereby the space in the drive device can be used effectively. As a result, the overall size of the drive device can be reduced.

According to an exemplary aspect of the invention, when the drive device is mounted on a vehicle, it is preferable that the driving output device is located as close to the center of the vehicle as possible in the width direction of the vehicle. In view of the balance in size between the engine and the drive device, it is preferable to position the driving output device as close to the engine as possible. By using the structure described above, the input shaft, the differential gear unit, and the first rotating electrical machine are sequentially arranged in this order from the engine side. As a result, in the case where the driving output device is positioned on the input shaft side, the driving output device and the first rotating electrical machine can be positioned so as not to axially overlap each other. Since these relatively large components are displaced in the axial direction, a radial increase in size of the drive device can be prevented, and the overall size of the drive device can be reduced.

According to an exemplary aspect of the invention, in the space generated radially outside the rotating electrical machines because of their reduced diameter, the second component different from the first component is positioned within a height range that is occupied by the first rotating electrical machine in the up-down direction. The space in the drive device can be used more effectively. As a result, the overall size of the drive device can be reduced.

According to an exemplary aspect of the invention, the inverter unit can be accessed through an opening by forming the opening in the lower part of a drive device case. Maintenance, inspection, repair, and the like of the inverter unit can thus be performed with improved workability.

According to an exemplary aspect of the invention, the rotating electrical machines and the differential gear unit are supplied with a lubricant for cooling or lubricating these components. The control device, on the other hand, requires electric insulation because it includes electric parts such as the inverter unit. It is therefore preferable that the control device is not in contact with the lubricant or the like. According to the above structure, the first chamber accommodating the rotating electrical machines and the differential gear unit and the second chamber accommodating the control device are separated from each other in a fluid-tight manner. The lubricant can therefore be properly supplied to the rotating electrical machines and the differential gear unit while easily assuring electric insulation of the control device accommodated in the second chamber.

What is claimed is:

1. A drive device, comprising:
   an input shaft connected to an engine;
   a first rotating electrical machine and a second rotating electrical machine;
   a differential gear unit including a first rotating element connected to the first rotating electrical machine, a second rotating element connected to the input shaft, and a third rotating element serving as an output rotating element; and
   a control device that controls the first rotating electrical machine and the second rotating electrical machine, wherein:
      the first rotating electrical machine and the differential gear unit are positioned coaxially with the input shaft,
      the first rotating electrical machine and the second rotating electrical machine are positioned on different axes from each other so as to axially overlap each other, and
      a first component of the control device is positioned lower than the first rotating electrical machine and positioned so that at least a part of the first component overlaps the first rotating electrical machine when viewed in a vertical top plan view.

2. The drive device according to claim 1, further comprising:
   a driving output device having an input gear connected to the output rotating element in order to transmit a rotation driving force of the input gear to an output shaft, wherein:
      a rotation axis of the input gear is positioned lower than the input shaft, and
      the first component is positioned so that at least a part of the first component overlaps the input gear in an up-down direction.

3. The drive device according to claim 2, wherein a rotation shaft of the second rotating electrical machine is positioned higher than the input shaft and positioned on a same side as the output shaft with respect to a vertical plane extending through the input shaft.

4. The drive device according to claim 2, wherein the input shaft, the differential gear unit, and the first rotating electrical machine are sequentially arranged in this order from an engine side.

5. The drive device according to claim 1, wherein a second component of the control device, which is different from the first component, is positioned so that at least a part of the second component overlaps the first rotating electrical machine in an up-down direction.

6. The drive device according to claim 1, wherein:
   the control device includes an inverter unit that performs a conversion between direct current power and alternating current power, and
   the first component is the inverter unit.

7. The drive device according to claim 1, further comprising:
   a case having a first chamber and a second chamber that are separated from each other in a fluid-tight manner, wherein:
      the first chamber accommodates the first rotating electrical machine, the second rotating electrical machine, and the differential gear unit, and
      the second chamber accommodates the control device.

8. The drive device according to claim 3, wherein the input shaft, the differential gear unit, and the first rotating electrical machine are sequentially arranged in this order from an engine side.

9. The drive device according to claim 2, wherein a second component of the control device, which is different from the first component, is positioned so that at least a part of the second component overlaps the first rotating electrical machine in the up-down direction.

10. The drive device according to claim 2, wherein:
    the control device includes an inverter unit that performs a conversion between direct current power and alternating current power, and
    the first component is the inverter unit.

11. The drive device according to claim 2, further comprising:
    a case having a first chamber and a second chamber that are separated from each other in a fluid-tight manner, wherein:
       the first chamber accommodates the first rotating electrical machine, the second rotating electrical machine, and the differential gear unit, and
       the second chamber accommodates the control device.

12. The drive device according to claim 8, wherein a second component of the control device, which is different from the first component, is positioned so that at least a part of the second component overlaps the first rotating electrical machine in the up-down direction.

13. The drive device according to claim 12, wherein:
the control device includes an inverter unit that performs a conversion between direct current power and alternating current power, and
the first component is the inverter unit.

14. The drive device according to claim 13, further comprising:
a case having a first chamber and a second chamber that are separated from each other in a fluid-tight manner, wherein:
the first chamber accommodates the first rotating electrical machine, the second rotating electrical machine, and the differential gear unit, and
the second chamber accommodates the control device.

15. The drive device according to claim 3, wherein a second component of the control device, which is different from the first component, is positioned so that at least a part of the second component overlaps the first rotating electrical machine in the up-down direction.

16. The drive device according to claim 3, wherein:
the control device includes an inverter unit that performs a conversion between direct current power and alternating current power, and
the first component is the inverter unit.

17. The drive device according to claim 3, further comprising:
a case having a first chamber and a second chamber that are separated from each other in a fluid-tight manner, wherein:
the first chamber accommodates the first rotating electrical machine, the second rotating electrical machine, and the differential gear unit, and
the second chamber accommodates the control device.

18. The drive device according to claim 8, wherein:
the control device includes an inverter unit that performs a conversion between direct current power and alternating current power, and
the first component is the inverter unit.

19. The drive device according to claim 8, further comprising:
a case having a first chamber and a second chamber that are separated from each other in a fluid-tight manner, wherein:
the first chamber accommodates the first rotating electrical machine, the second rotating electrical machine, and the differential gear unit, and
the second chamber accommodates the control device.

* * * * *